(12) United States Patent
Clasen et al.

(10) Patent No.: US 6,796,143 B2
(45) Date of Patent: Sep. 28, 2004

(54) PROCESS FOR PRODUCING $SiO_2$-$TiO_2$ GLASSES HAVING A LOW COEFFICIENT OF THERMAL EXPANSION

(75) Inventors: Rolf Clasen, Saarbrücken (DE); Helmut Mangold, Rodenbach (DE); Klaus Deller, Hainburg (DE); Gerrit Schneider, Hanau (DE); Christine Wagner, Saarbrücken (DE)

(73) Assignee: Degussa AG, Düsseldorf (DE)

( * ) Notice: Subject to any disclaimer, the term of this patent is extended or adjusted under 35 U.S.C. 154(b) by 82 days.

(21) Appl. No.: 09/794,251

(22) Filed: Feb. 28, 2001

(65) Prior Publication Data

US 2002/0026810 A1 Mar. 7, 2002

(30) Foreign Application Priority Data

Sep. 1, 2000 (EP) .............................. 00118974

(51) Int. Cl.[7] .................................. C03B 8/00
(52) U.S. Cl. .......................... 65/17.3; 65/17.6
(58) Field of Search ................. 264/621; 501/12, 501/53; 65/399, 413, 414, 416, 17.2, 17.3, 17.4, 17.6, 22, 30.1

(56) References Cited

U.S. PATENT DOCUMENTS

| | | | |
|---|---|---|---|
| 2,326,059 A | | 8/1943 | Nordberg |
| 4,039,339 A | | 8/1977 | Elmer et al. |
| 4,112,032 A | * | 9/1978 | Blaszyk et al. ............ 264/42 |
| 4,212,661 A | * | 7/1980 | Jung ......................... 65/17.6 |
| 4,278,632 A | | 7/1981 | Yoldas |
| 4,786,618 A | | 11/1988 | Shoup |
| 5,067,975 A | * | 11/1991 | Backer et al. ............. 65/413 |
| 5,154,744 A | * | 10/1992 | Blackwell et al. ......... 65/413 |
| 5,171,344 A | | 12/1992 | Noda |
| 5,290,332 A | * | 3/1994 | Chatterjee et al. .......... 65/17.3 |
| 5,358,913 A | * | 10/1994 | Chatterjee et al. ......... 501/103 |
| 5,769,914 A | * | 6/1998 | Ku ............................ 55/320 |
| 5,795,362 A | * | 8/1998 | Chatterjee et al. .......... 65/17.3 |
| 5,970,751 A | | 10/1999 | Maxon et al. |
| 6,051,277 A | * | 4/2000 | Claussen et al. .......... 427/376.3 |
| 2002/0162357 A1 | * | 11/2002 | Tennent et al. ............ 65/17.4 |

FOREIGN PATENT DOCUMENTS

| | | | | |
|---|---|---|---|---|
| GB | 2076391 A | * | 12/1981 | ........... C03C/17/23 |
| GB | 2 083 806 | | 3/1982 | |

OTHER PUBLICATIONS

Copy of International Search Report for application EP 01 11 7812, dated Dec. 6, 2001.

Nozawa et al., "Manufacture of metal oxide droped quartz glass articles", Chemical Abstracts *& Indexes, US, American Chemical Society, Columbus, Bd. 115, Nr. 22, 1991 XP000376039 ISSN: 0009–2258 *Zusammenfassung*.

Database WPI Section Ch, Week 198724 Derwent Publications Ltd., London, GB; Class E36, An 1987–167500 XP002158617 & JP 62 100443 A (Seiko Epson Corp), May 9, 1987 *Zusammenfassung*.

Elmer T H: "Use of Alkoxides in the Preparation of Low–Expansion Reconstructed TIO2–SI02 Glasses", Bd. 65, Nr. 10, Oct. 1, 1992, Seiten 279–286, XP000321858 *Zusammenfassung*.

Mineham: "Sinterring of titania–silica powder compacts with a bimodal pore–size distribution" Journal of Non–Crystalline Solids, Bd. 147–148, 1992, Seiten 582–587, XP002158616 *Zusammenfassung*.

* cited by examiner

*Primary Examiner*—Peter Chin
*Assistant Examiner*—Carlos Lopez
(74) *Attorney, Agent, or Firm*—Smith, Gambrell & Russell, LLP

(57) ABSTRACT

$SiO_2$—$TiO_2$ glasses having a low coefficient of thermal expansion are produced by a molding being produced that consists of $SiO_2$ powder, $SiO_2$—$TiO_2$ powder or $TiO_2$ powder and that contains by way of secondary component a titanium-containing component which is converted into amorphous $TiO_2$.

9 Claims, 1 Drawing Sheet

Phase Diagram of the System $SiO_2$-$TiO_2$

Phase Diagram of the System $SiO_2$-$TiO_2$

PROCESS FOR PRODUCING SIO₂-TIO₂ GLASSES HAVING A LOW COEFFICIENT OF THERMAL EXPANSION

The invention relates to a process for producing $SiO_2$—$TiO_2$ glasses having a low coefficient of thermal expansion.

Known $SiO_2$—$TiO_2$ glass-forming systems are distinguished by their good thermal properties, their high refractive index and their low coefficients of thermal expansion. In comparison with silica glass, this system has good resistance to alkali vapors at relatively high temperatures. This property finds application, for example, in the coating of lamps (E. B. Yoldas, Method of conforming clear vitreous gel of silica-titania material. U.S. Pat. No. 4,278,632, Westinghouse Electric Corp., USA, 8.2.1980).

A further important property of the $SiO_2$—$TiO_2$ system is the low coefficient of thermal expansion. This is of significance for the production of optical components in which the dimensional accuracy over a wide range of temperature plays a prominent role (D. R. Shoup, Sol-gel method for making ultra-low expansion glass. U.S. Pat. No. 4,786,618, Corning Glass Works (USA), 29.05.1998).

On account of the great commercial interest in these systems, processes are being sought that guarantee rapid and cost-effective production.

One known possibility for producing binary $TiO_2$—$SiO_2$ glasses is offered by melting. However, the melting-temperature is very high at 1,700° C., and phase separation and devitrification occur very readily during cooling of the glass melt (Z. Deng, E. Breval and C. G. Pantano, Colloidal sol/gel processing of ultra-low expansion $TiO_2/SiO_2$ glass. J. Non-Cryst. Solids 100 (1988) 364–370).

The phase diagram shows that the crystalline form of $TiO_2$ possesses low solubility in $SiO_2$ even at elevated temperatures (FIG. 1) (E. M. Levin, C. R. Robbin and H. F. McMurdie, $SiO_2$—$TiO_2$ phase diagram, in: Phase Diagrams for Ceramists, M. K. Reser, Editor (1956), The American Ceramic Society: Columbus, Ohio (USA), p 1).

A known alternative to fusing of the initial components is offered by flame hydrolysis. Initial investigations in this field were carried out by Nordberg. In U.S. Pat. No. 2,326,059, dating from 1943, he describes the production of $TiO_2$—$SiO_2$ glass by a process of flame oxidation of a mixture consisting of $TiCl_4$ and $SiCl_4$. In this process a glass is formed having a $TiO_2$ content of 5–11 wt. % and a coefficient of thermal expansion below that of silica glass. He ascribes this behavior to the direct interchange of $SiO_2$ with $TiO_2$ (M. E. Nordberg, Glass having an expansion lower than that of silica. U.S. Pat. No. 2,326,059, Corning Glass Works, New York).

Further investigations in this field were carried out by P. C. Schultz. For the process of flame hydrolysis he used a small two-burner furnace in order to produce small pear-shaped mouldings in a manner similar to the Nordberg patent. These glass mouldings are precipitated on a vessel at 1,700° C. In this process it was possible for $SiO_2$—$TiO_2$ glasses to be produced having a $TiO_2$ content of up to 16.5 wt. %. Glasses with a content of titanium dioxide between 12 and 17 wt. % are metastable and show structural alterations that have an effect on the coefficient of thermal expansion. Larger contents of titanium dioxide cause phase separation or crystallization. Starting from 18.5 wt. % $TiO_2$ the glass was semitranslucently white and at 19.4 wt. % it was white and opaque. By means of X-ray diffraction it was possible for small quantities of rutile and anatase to be detected. The limit for vitrification via flame hydrolysis lies between 16.5 and 18.5 wt. % $TiO_2$.

Moreover, Schultz ascertained that between 0 and 10 wt. % $TiO_2$ and in the temperature-range between 25 and 700° C. the coefficient of thermal expansion becomes negative with increasing content of titanium oxide (P. C. Shultz, Binary Titania-Silica Glasses Containing 10 to 20 wt. % TiO2. J. Am. Ceram. Soc. 59 (1976) 214–219).

Further known investigations on this subject were carried out by J. E. Maxon. His patent U.S. Pat. No. 5,970,751, dating from 1999, is concerned with the production of silicate glass with admixture of titanium dioxide by flame hydrolysis a mixture consisting of $SiO_2$ precursor and $TiO_2$ precursor.

Relatively pure metal oxides can be produced by thermal decomposition of the precursors and precipitation of the resulting oxides. The precursors can be converted into vapor form or supplied to the flame in finely divided form in gas (for example, $N_2$). In addition to titanium chloride or silicon chloride, octamethyl cyclotetrasiloxanes (OMCTS), titanium alkoxides or titanium isopropoxides are employed as precursors. In the case where use is made of these chlorine-free precursors, deposits may occur in the pipelines that transport the mixture of the two precursors. This results in undesirable variations in the chemical composition of the powders, and ultimately it becomes necessary to close the apparatus down for the purpose of cleaning. The invention that is set forth in the patent in question, U.S. Pat. No. 5,970,751, is intended to lessen these deposits; as a result, the running-time until the next cleaning is to be extended. In addition, the quality of the glass is to be improved.

The process due to Maxon arose in the course of efforts to convert the process from chlorides to more environmentally friendly precursor material (OMCTS and titanium isopropoxide). Alkoxides of transition metals are known for their sensitivity to light and moisture. Metal alkoxides are oxidized by moisture to give hydroxides and the oxides of the corresponding metal. OMCTS has proved to be a source of the moisture. Care needs to be taken to ensure that the water content lies below 2 ppm, in order that the white precipitate can be avoided. It has likewise been shown that the temperature of the pipelines through which the precursor mixtures flow has to be controlled; if it is too low, the constituents can be precipitated by condensation (E. J. Maxon, Fused $SiO_2$—$TiO_2$ glass. U.S. Pat. No. 5,970,751, Corning INC (USA), 22.9.1998).

Another known possibility for producing clear titanium-oxide/silicate glass with 7.4 wt. % titanium dioxide has been offered by Corning for as long as 20 years with the CVD process. This is a gas-phase deposition process. The temperatures lie between 200 and 2,000° C. Depending on the manner of the supply of energy, one speaks of thermal, plasma-activated, photon-activated or laser-activated gas-phase deposition. With this method the production of a clear glass with 16 wt. % $TiO_2$ is possible, but the rate of deposition is relatively low. In order to obtain glass with various shapes, machining is necessary (W. T. Minehan, G. L. Messing and C. G. Pantano, Titania-silica glasses prepared by sintering alkoxide derived spherical colloids. J. Non-Cryst. Solids 108 (1989) 163–168).

The most frequently employed method for producing $SiO_2$—$TiO_2$ glasses is the sol-gel process. In many cases this is a matter of the hydrolysis and condensation of organometallic compounds. In his U.S. Pat. No. 4,278,632, Yoldas showed a method with the aid of which clear vitreous material can be produced that mainly contains silicon dioxide and titanium dioxide, whereby the content of titanium dioxide can amount to up to 40 wt. % without the constituents having to be melted.

For the production of these glasses a clear organic solution of partially hydrolysed alkoxides is produced separately from one component of the binary system. The other component of the binary system is added to this solution in the form of alkoxides or a clear organic, partially hydrolysed solution of the alkoxides. Water is additionally added to the resulting reaction solution, in order to complete the hydrolysis of the silicon and titanium alkoxides. After the hydrolysis, the material is dried and then heated to temperatures from 400° C. to 600° C., in order to remove the residual organic constituents and to produce a clear binary material. With this method a very active glass powder can also be produced which after the shaping is sintered at temperatures of 1,200° C. for 2 hours.

Known results were achieved by the Japanese researchers T. Hayashi et al. They mixed 0.01–0.05 mol titanium tetraisopropoxide and 0.2–0.25 mol tetraethyl orthosilicate (TEOS) in 150 cm$^3$ ethanol at room temperature. A mixture consisting of water, HCl and 30 cm$^3$ ethanol is added to the alkoxide solution subject to constant stirring, with a view to starting the hydrolysis. The molar ratio of water and HCl to the alkoxides amounts to 2:50. Gelling of the mouldings is effected within 1 to 10 days, depending on the conditions of hydrolysis. The gels are dried for 3 months and subsequently slowly heated to 100° C., maintained at this temperature for one day and then heated to 800° C. at a rate of 10° C./min. In this context it can also be shown that titanium tetraisopropoxide hydrolyses significantly more rapidly than TEOS. This has the consequence that, in the case of a mixture consisting of both substances, titanium tetraisopropoxide hydrolyses more rapidly and an undesirable phase separation occurs. This can be avoided by only a limited quantity of water and HCl being dissolved in ethanol and by this solution being added very slowly to the alkoxide solution. Optimal conditions for obtaining clear gels are characterized by the following molar ratios: $H_2O$/alkoxide=16, HCl/alkoxide=0.03.

For the purpose of producing the glass, the samples are heated to 800° C. Transparent glass can only be achieved from clear gels. Glass with 3.4 to 25 wt. % $TiO_2$ can be produced by means of the method due to Hayashi et al. Glasses that contain less than 12.9 wt. % $TiO_2$ have a coefficient of thermal expansion like those produced by flame hydrolysis. If the glasses contain anatase crystals, the thermal expansion is greater than expected. In the event of further heating to 1,100° C., glasses with 10.4 wt. % $TiO_2$ remain transparent. In the case of glasses with 20 wt. % $TiO_2$, at 900° C. the crystalline phase anatase is formed (T. Hakashi, T. Yamada and H. Saito, Preparation of titania-silica glasses by the gel method. J. Mater. Sci. 18 (1983) 3137–3142).

Further studies in this field by D. R. Shoup are known. His U.S. Pat. No. 4,786,618, dating from 1988, describes a process for producing ultra-low-expansion glass (ULE) from $SiO_2$ and $TiO_2$, the properties of which have only been attained hitherto by glasses that are deposited from the gas phase. These glasses are formed from a stable alkali silicate solution with colloidal $TiO_2$ having a pH value of >9 via a silicate gel in which colloidal $TiO_2$ is distributed homogeneously. After the alkali ions have been removed, the gel is dried and consolidated to form a clear, dense glass. This glass is free from inhomogeneities and has a lower coefficient of thermal expansion than silica glass. The glasses that are produced in this way contain between 3 and 10 wt. % $TiO_2$, between 90 and 97 wt. % $SiO_2$, 100–200 ppm alkali metals and 1–200 ppm iron. The average coefficient of thermal expansion between $TiO_2$ 0–300° C. amounts to 5·10-7/K which corresponds to that of pure silica glass.

The article dating from 1988 by Z. Deng describes another method for producing ULE glasses from the $SiO_2$—$TiO_2$ system via a sol-gel process. Glasses having a $TiO_2$ content between 0 and 9 wt. % can be produced. To this end, colloidal silicon-dioxide powder (Aerosil A200) is dispersed in a solution of titanium dioxide. In this process the stability of the solution plays a prominent role, since $SiO_2$ particles have to be distributed therein homogeneously in order finally to obtain a homogeneous moulding. Earlier publications have shown that titanium glycoxides (produced by hydrolysis and linkage of titanium isopropoxides in ethylene glycol and citric acid at 120° C.) are suitable. The carbonization of the remaining glycoxides frequently brings about crystallizations during sintering. An acidic solution of titanium oxide is obtained by hydrolysis and peptization of titanium isopropoxides in a large number of simple acids such as hydrochloric acid or nitric acid.

For the purpose of producing these solutions, titanium isopropoxides are mixed with acid and then water is added. After 30 to 60 minutes of stirring, the solution is clear. The solution of titanium oxide is stable for 2 to 3 days at room temperature. After the mouldings have been produced, gelling is effected in 4 days at 25° C. [sic] or in 2 days at 60° C. This is directly followed by a heat treatment at 500° C., in order to remove absorbed water and other organic constituents. This can be demonstrated by thermogravimetric measurements. In this connection, on account of the loss of water between 25 and 125° C. a loss of mass amounting to 3–4% is ascertained. Between 250 and 450° C. a further loss of mass amounting to 1–2% arises. A rate of heating from 20 to 50° C./min and two plateaus, one at 1,200–1,250° C. and the other at 1,450–1,500° C., prove to be advantageous for the sintering. Air is used as furnace atmosphere. The greatest shrinkage takes place between 1,200 and 1,250° C. Here the residual moisture (or, to be more exact, OH groups) escapes, which at higher temperatures leads to the formation of bubbles. Between 1,450 and 1,500° C. the glass attains the highest density and becomes clear. Various thermal analyses establish a connection between the content of titanium dioxide and an exothermic reaction between 1,200 and 1,400° C. Here a reaction presumably takes place between silicon dioxide and titanium dioxide. However, a quantitative analysis is not yet possible. It has been shown that gels with a higher content of titanium oxide are more difficult to sinter.

Similarly, Deng is also able to ascertain an improvement in the transparency of the glasses if sintering is effected up to 1,200° C. in an atmosphere of He. In addition, it becomes evident that the tendency towards the formation of bubbles is further reduced. Another important step according to Deng in the production of fissure-free glasses is the drying. The gelled bodies that are formed are very weak mechanically, so fissures could arise during the release from the mould and drying. The linear shrinkage during drying amounts to 24%. The linear shrinkage during sintering amounts to 32% and takes place mainly between 1,000 and 1,200° C.

Mineham describes the production of titanium-silicate glass via the sintering of $TiO_2$—$SiO_2$ powder. For this purpose, the powder is produced from the organic precursors. Subsequent production of mouldings is effected by a method of powder technology. In this case transparent glasses with up to 8.5 wt. % $TiO_2$ are possible. The characterisation of the mouldings shows that with a $TiO_2$ content of <8.5 wt. % said mouldings show no crystallization. In the case of mouldings with 8.5 wt. % [sic], crystallization is occasionally observed. The chemical composition of the crystalline phase cannot be identified, on account of its rarity and size. If the content of titanium dioxide rises to 11.5 wt. %, the crystalline portion also increases. Regions with anatase and those with rutile are discovered.

Mineham is able to demonstrate that the phase separation in glasses with 8.5 wt. % $TiO_2$ changes the expansion behavior. Glasses with 11.5 wt. % $TiO_2$, in which crystallization and phase separation occur more intensely than in the case of glasses with 8.5 wt. % [sic], have a thermal expansion similar to the glasses with 3.1 wt. % $TiO_2$. In general, the coefficient of thermal expansion of 2.6 and—0.38·10-7 [sic]/° C. lies at temperatures between 25 and 700° C. and with a content of titanium dioxide from 3.1 to 8.5 wt. %. The powder and the corresponding glass are examined with the aid of FTIR. An absorption band arises at 3,660 cm-1 [sic], which provides information about the number of OH groups. In addition, the bands that are characteristic of pure silica glass can be detected at 1,100-1,200, 800 and 460 cm-1 [sic] in titanium-dioxide/$SiO_2$ powders and glasses. The absorption band between 920 and 960 cm-1 [sic] is caused by tetrahedra of titanium oxide.

Mineham [sic] describes the production of $SiO_2$—$TiO_2$ mouldings having a bimodal pore-size distribution by spontaneous emulsification of partially hydrolysed alkoxides such as $Si(OC_2H_5)4$ [sic], $H_2O$ [sic] $C_2H_5OH$ and HCl in a molar ratio of 0.944:1.3:9:0.0027, which react for 90 min in a closed container at 25° C., before 0.056 mol titanium isopropoxide are added. 120 minutes after the addition, emulsification is induced by 3-% $NH_4OH$aq being added to the above composition in a ratio of 2:1. The average particle size of the powder turns out to be 130 nm, and the BET surface area amounts to 310 $m^2$/g. The mouldings have a bimodal pore-size distribution with pores measuring 6 nm and 50 nm.

The densification behavior of the mouldings that are produced via colloidal gelling is studied. In this connection it is a question of homogeneous mouldings with a high packing density. The samples are dried in air under normal conditions.

Mouldings between 0.2 g and 0.4 g are sintered isothermally in a mullite furnace. All the temperature programs include a holding-time of 2 h at 900° C. in order to enable a structural relaxation prior to densification. The rate of heating amounts to 10° K/min. The samples are sintered in air at 1,075, 1,150, 1,200 and 1,250° C. The sintering-time of 0 is defined as the moment at which the furnace attains the sintering-temperature.

At 1,075° C. a densification takes place only by intraparticle sintering. On account of the shrinkage of the particles, the pore-size distribution becomes narrower. At 1,175° C. the slope of the curve changes, on account of the interparticle densification which, on account of the larger pores, is slower than the intraparticle densification. Starting from 1,200° C., no change in the densification-rate is observed any longer, on account of the rapid and complete intraparticle densification during heating up to the sintering-temperature. Above 1,200° C., the densification-rate no longer changes, on account of the rapid and complete shrinkage of the intraparticle porosity. During the second sintering step the densification takes place only via interparticle pore shrinkage. At a relative density of 84% a network of large elliptical pores measuring 0.1 $\mu$m becomes evident. At relative 96% density are of relative density [sic] the fine pores are eliminated and the size of the large pores is reduced (W. T. Minehan, M. R. Schaefer and G. L. Messing, Sintering of titania-silica powder compacts with a bimodal pore-size distribution. J. Non-Cryst. Solids 147 & 148 (1992) 582–587).

The sintering behavior of binary glass-forming $SiO_2$—$TiO_2$ systems is studied by Ki-Dong Kim. The amorphous gels are produced via hydrolysis and condensation of organometallic compounds and water. To this end, a certain quantity of ethyl silicate and titanium isopropoxide is stirred at room temperature into 100 $cm^3$ isopropanol. Water and 0.5 N HCl (catalyst) for the hydrolysis are added. The gel is dried for three days at 70° C. The dried transparent gel is pulverized and again dried at 600° C. in order to remove the organic constituents. The powder that has been formed has an average grain size of 10 $\mu$m.

The mouldings are firstly pressed uniaxially at 135 MPa before they are subjected to further processing by cold isostatic pressing at 270 MPa. After drying at 120° C. (for 12 hours) a green density results amounting to 0.7±0.02 [sic] of the theoretical density. The sintering curve as a function of the temperature can be divided up into three regions: T<Tsin, Tsin<T<Tcryst and T>Tcryst. These characteristic points are determined by applying a tangent to the corresponding points of the curve. At temperatures below Tsin the shrinkage is still negligibly small. In the range Tsin<T<Tcryst the shrinkage rises, on account of the falling viscosity of the vitreous phase with increasing temperature. In the temperature-range above Tcryst the shrinkage stagnates, on account of the crystallization which sets in. Starting from this temperature, sintering is effected more slowly with increasing temperature. The crystallization reduces the proportion of the vitreous phase and finally becomes an obstacle to the viscous flow of the remaining vitreous phase. In mouldings that are sintered above the temperature Tcryst, cristobalite can be detected as crystalline phase by means of powder diffractometry. According to the method due to Kim Dong [sic] Kim it is possible to produce glasses with up to 8 mol. % $TiO_2$. Starting from 8 mol. %, crystallization occurs during the heat treatment.

Kim Dong [sic] Kim has also shown that the viscous flow of the primary particles is decisive for the sintering process. At the start of sintering, a viscosity from 1,011 to 1,012 dPa·s obtains. In addition, the influence of $TiO_2$ on the glass structure and the viscosity is investigated by Kim Dong [sic] Kim. It has become evident that the addition of $TiO_2$ to silica glass lowers the viscosity of this glass. The sintering-temperature and the coefficient of thermal expansion fall with increasing $TiO_2$ content. The coefficient of thermal expansion accordingly falls with falling viscosity. Presumably this can be ascribed to the fact that $TiO_2$ is able to act as a network-former, i.e. [$TiO_4$] tetrahedra are formed, and finally a denser glass network is created. However, investigations with IR spectroscopy have shown that $TiO_2$ weakens the network rather than strengthens it. A precise clarification of this phenomenon is still awaited (K.-D. Kim and T. Khalil, Sintering behavior of gel powder in binary glass-forming SiO2—TiO2 [sic] system. J. Non-Cryst. Solids 195 (1996) 218–222).

The known processes have the disadvantage that, via the direct gas-phase deposition of $SiO_2$—$TiO_2$ glasses, they are relatively slow and enable only low rates of deposition. As a result, high production costs arise. Larger mouldings can be produced via the sol-gel processes. However, the green densities that can be produced with this process [sic] are very low, so that high shrinkage-rates occur in the course of drying and sintering. Therefore these process steps have to be carried out very slowly, in order to avoid fissuring. This in turn increases the production costs. Even with an addition of Degussa Aerosil 200 instead of the expensive initial material TEOS the green density of the mouldings could not be significantly increased.

The object of the invention is consequently to develop a process for producing $SiO_2$—$TiO_2$ glasses that does not exhibit these disadvantages.

The invention provides a homogeneous, binary $SiO_2$—$TiO_2$ glass having a low coefficient of thermal expansion.

The invention provides a process for producing $SiO_2$—$TiO_2$ glasses having a low coefficient of thermal expansion, in particular for producing a homogeneous binary $SiO_2$ glass having a low coefficient of thermal expansion $\leq 0.5 \cdot 10\text{-}6/K$ [sic], said process being characterized in that a moulding with a relative green density>40% is produced that consists, in the principal component, of dense $SiO_2$ powder, $SiO_2$—$TiO_2$ powder or $TiO_2$ powder or a mixture of these powders and contains by way of secondary component a titanium-containing component that is converted into amorphous $TiO_2$ at the latest in the course of the conclusive sintering of the moulding.

After drying of the moulding, the titanium-containing component can be introduced into the open pores of the moulding.

The powders that are employed can have a diameter between 5 nm and 20 µm.

The powders that are employed can exhibit an at least bimodal distribution [sic] and result in a moulding with a bimodal pore distribution.

The powders that are employed can exhibit a bimodal distribution [sic] from 5 to 100 nm, preferably from 8 to 80 nm, and 1 to 50 µm, preferably 5 to 20 µm.

The linear shrinkage on drying can amount to 0.1 to 10%.

The linear shrinkage on sintering can amount to less than 30%.

According to the invention, a dense $SiO_2$—$TiO_2$ glass can be formed from the moulding by sintering at temperatures <1,500° C.

DETAILED DESCRIPTION OF INVENTION

Figure 1:
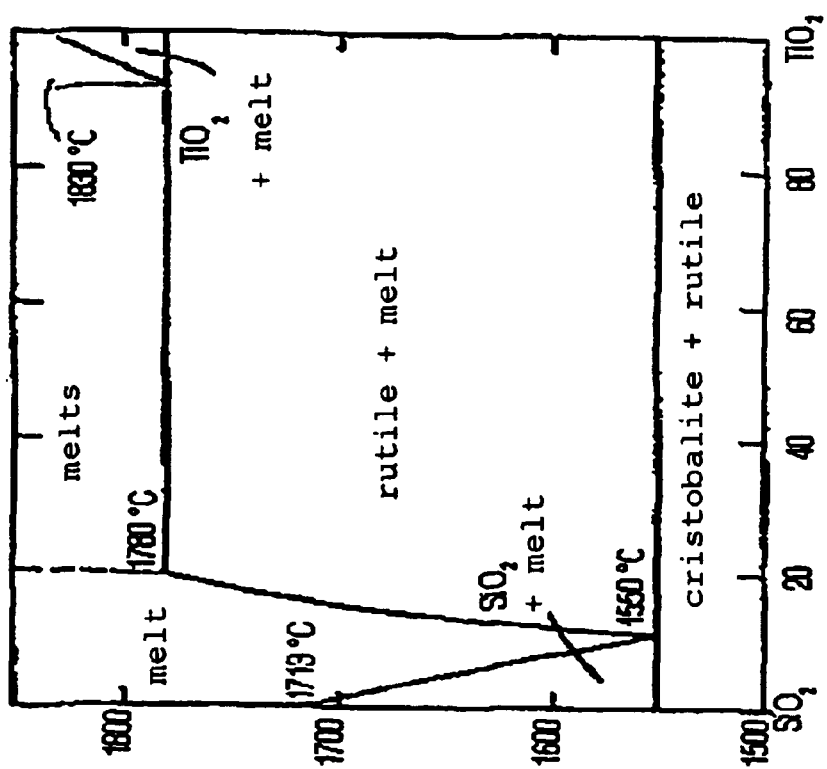
FIG. 1 is a phase design of the system $SiO_2$—$TiO_2$.

The process according to the invention solves the existing problems in that mouldings having a higher green density are produced consisting, in the principal constituent, of dense particles, produced as a matter of priority via gas-phase deposition, consisting of silica glass, amorphous $TiO_2$ or mixtures of nanoscale $SiO_2$—$TiO_2$ glass powders and after shaping are sintered below the melting-temperature to form a homogeneous, dense glass.

By way of secondary component, a titanium alkoxide or other titanium-containing salts capable of being converted into $TiO_2$ can be added, which are added already to the initial suspension consisting of silica-glass particles or nanoscale $SiO_2$—$TiO_2$ glass powders or are employed for the purpose of redensification of a porous moulding consisting of nanoscale silica-glass particles or nanoscale $SiO_2$—$TiO_2$ glass powders. The titanium alkoxide can be converted into amorphous $TiO_2$ by hydrolysis and condensation, or the titanium-containing salts can be converted into amorphous $TiO_2$ by appropriate reactions after shaping or in the course of redensification after complete filling of the pores of the open-pore green body.

By way of silica-glass powders, commercial pyrogenic silicic acids (for example, aerosils produced by Degussa AG) can be employed. Aerosil OX50 has proved to be a particularly suitable initial powder. This powder exhibits a broad particle distribution from 10 to 100 nm with a maximum of the diameter distribution at about 50 nm. For the purpose of increasing the green density of the mouldings it has proved advantageous to shift the particle distribution towards larger diameters through addition of larger particles (for example, Degussa Elsil). The supplementary addition of extremely fine aerosils such as, for example, Aerosil 380, in small quantities (0.1 to 15 wt. %) increases the green strength of the mouldings.

The green bodies according to the invention are characterized in that they exhibit a bimodal pore distribution by virtue of an appropriate composition of the initial powders.

These initial powders or substances can be densified by known shaping processes in such a way that a moulding is formed having a green density that is as high as possible and having a homogeneous pore distribution. For simple geometries, dry pressing is suitable, but agglomerates in the initial powders can only be dissolved with difficulty with this shaping process. This easily results in inhomogeneities in the mouldings. It has therefore proved advantageous to disperse the initial powder in a liquid, as a matter of priority in pure water. Known dispersing tools such as high-speed stirrers and dissolvers can be employed in this connection. In order to avoid abraded metallic material, which may contaminate the $SiO_2$—$TiO_2$ glasses, the surfaces can be provided with visco-elastic plastics. By this means, both undesirable discolorations and the entrainment of crystal nuclei can be prevented.

Depending on the filler loading and the particle-size distribution, a more or less viscous suspension can arise, whereby better dispersal can be obtained with lower viscosities. The highly viscous suspensions (melts) can be directly filled into a mould or extruded. In the case of the low-viscosity suspensions with a lower filler loading, a deposition of the dispersed particles may be necessary, in order to obtain the desired high green density of the moulding. Very well suited for this purpose are, for example, the electrophoretic processes familiar to a person skilled in the art. The addition of alkoxides or other reactive Ti salts requires that the reactions [sic] sets in only with a time delay after the shaping of the melt or suspension. This [sic] conditions and additives necessary for this purpose are known from sol-gel chemistry.

After the shaping from suspensions or melts, the moulding is dried. In the course of the implementation according to the invention the linear shrinkage on drying may be between 0.1 and 10%. Therefore a conventional drying in a few hours, as is familiar from the production of fine-ceramic products, is fully sufficient. A conventional drying lasting for weeks or a shortened drying under supercritical conditions in an autoclave, which is frequently necessary for the drying of large mouldings produced via the sol-gel process, is not required with the process according to the invention. As a result, considerable production costs are saved.

After drying, an additional saturation of the moulding with a solution of titanium alkoxide or another reactive Ti salt can be effected. By way of solvents for this purpose, liquids are employed that has [sic] a lower surface tension than the liquid of the suspension or melt. As a result, this solvent can be rapidly removed after the reaction of the dissolved components without there being any risk of the formation of cracks upon drying. The titanium alkoxides and reactive Ti salts that are used are characterized in that they are converted into $TiO_2$ and volatile components at the latest in the course of the conclusive sintering. The proportion of $TiO_2$ in the glass amounts to between 0.1 and 15 wt. %. The $TiO_2$ mixes homogeneously with the $SiO_2$ matrix via diffusion, without crystalline phases forming.

In conclusion, the moulding is sintered to form a dense, transparent glass. The formation of bubbles in the glass can be reduced by sintering being effected in helium or in a vacuum. In the case of elongated mouldings (rods and tubes for example), zone sintering reduces the risk of the entrapment of gas bubbles.

What is claimed is:

1. A process for producing a homogeneous binary $SiO_2$—$TiO_2$ glass having a low coefficient of thermal expansion of $0.5 \leq 10^{-6}/K$ comprising:

providing a composition comprising a dense powder selected from the group consisting of $SiO_2$ powder, $SiO_2$—$TiO_2$ powder or $TiO_2$ powder and a mixture thereof and as a secondary component a titanium containing component, forming a moulding from said dense powder having a relative green density>40%, said moulding having open pores, drying and sintering said moulding, and converting said titanium containing component into amorphous $TiO_2$.

2. Process as set forth in claim 1, wherein the titanium-containing component is introduced into said open pores of the moulding after drying of the moulding.

3. Process as set forth in claim 1, wherein the powders that are employed have a diameter between 5 nm and 20 μm.

4. Process as set forth in claim 3, wherein the powders that are employed exhibit an at least bimodal distribution and result in a moulding with a bimodal pore distribution.

5. Process as set forth in claim 4, wherein the powders that are employed exhibit a bimodal distribution from 5 to 100 nm, and 1 to 50 μm.

6. Process as set forth in claim 1, wherein the linear shrinkage on drying amounts to 0.1 to 10%.

7. Process as set forth in claim 1, wherein the linear shrinkage on sintering amounts to less than 30%.

8. Process as set forth in claim 1, wherein a dense $SiO_2TiO_2$ glass is formed from the moulding by sintering at temperatures <1,500° C.

9. Process as set forth in claim 4, wherein the powders that are employed exhibit a bimodal distribution from 8 to 80 nm and 5 to 20 μm.

* * * * *